United States Patent Office 2,759,909  
Patented Aug. 21, 1956

2,759,909

PROCESS FOR PREPARING POLYVINYL DICARBOXYLIC ACID ESTERS

Gordon D. Hiatt and John Emerson, Rochester, N. Y., assignors to Eastman Kodak Company, Rochester, N. Y., a corporation of New Jersey No Drawing. Application June 18, 1952, Serial No. 294,273

10 Claims. (Cl. 260—78.5)

This invention relates to a process of preparing polyvinyl dicarboxylic acid esters in which a lower fatty acid is employed as the solvent therein and an acid-soluble salt showing a basic reaction is employed as the catalyst.

It has been the practice heretofore in preparing polyvinyl esters of phthalic acid to treat polyvinyl alcohol with phthalic anhydride in the presence of some catalytic agent, such as pyridine. The presence of acetic acid has always been assumed to be harmful in such a procedure, as it was thought that the presence of acetyl groups in the esterification mass reduced the amount of phthalyl which would be introduced into the polyvinyl compound.

One object of our invention is to provide a method of preparing polyvinyl dicarboxylic acid esters in which a lower fatty acid is employed as the solvent therein. Another object of our invention is to provide a process for the preparation of polyvinyl dicarboxylic acid esters from which materials difficult to use, such as pyridine per se or volatile solvents are absent. A further object of our invention is to provide a method for preparing polyvinyl dicarboxylic acid esters in which an acid-soluble salt showing a basic reaction is employed as the catalyst therein. Other objects of our invention will appear herein.

We have found that polyvinyl esters of good quality are obtained if polyvinyl alcohol (partially or completely hydrolyzed polyvinyl acylate) is reacted with a dicarboxylic acid anhydride in a bath in which a lower fatty acid is employed as the solvent and a basic salt is employed as the catalyst, and that little or no introduction of acetyl, other than that of the dicarboxylic acid, takes place. In such reaction the bath should either be completely anhydrous or contain such a small amount of water therein that the anhydride used is not measurably affected thereby, the criterion being that, upon the addition of the anhydride, the bath is anhydrous, and yet the amount of anhydride available is sufficient to effect the esterification of the polyvinyl alcohol.

In its broader aspects our invention comprises the mixing of polyvinyl alcohol with dicarboxylic acid anhydride, such as phthalic anhydride, and a lower fatty acid, such as glacial acetic acid. It is preferred that a basic salt soluble therein, such as anhydrous sodium acetate, be also employed. The mixing is preferably carried out in an apparatus in which heavy or viscous masses may be thoroughly mixed, such as a Werner-Pfleiderer mixer. The reaction is carried out at an elevated temperature, such as of at least 150° F., the temperature employed being only limited by the boiling temperatures of the materials which are employed in the reaction mass. A temperature of 160–180° F. is very convenient for most reactions in accordance with our invention, although our invention is not limited to that range. After the reaction has occurred, the mass is preferably cooled and the product obtained may be conveniently separated from the mass by adding water thereto while continuing the mixing. This method of recovering dicarboxylic esters of polymeric materials is described and claimed in Hiatt and Crane application Serial No. 294,272, filed of even date. In this way the polyvinyl phthalate is separated from everything else. Our reaction relates primarily to the preparation of the simple esters of polyvinyl alcohol although, if desired, a small quantity (such as up to 5%) of acetic anhydride can also be incorporated in the reaction mass, thus resulting in a polyvinyl acetate dicarboxylate.

Some of the anhydrides which are suitable for use in preparing polyvinyl esters are phthalic anhydride, nitro phthalic anhydride, succinic anhydride, maleic anhydride, etc. Some catalysts which are especially useful for promoting this process are the acetates of the alkali metals, the alkaline earth metals, or the organic amines. Some catalysts which are useful in this connection are sodium acetate, potassium acetate, calcium acetate, magnesium acetate, monomethyl amine acetate, pyridine acetate, ammonium acetate and the like. The catalyst may be employed in a small proportion if desired, but, on the other hand, larger proportions can be employed. Ordinarily 100% of catalyst, based on the weight of the polyvinyl alcohol starting material, is sufficient, but any amount within the range of 5–500%, based on the polyvinyl alcohol, can be employed and will promote the esterification. With the use of the higher proportions of catalyst, the use of larger proportions of solvent acid is recommended than where small proportions of catalyst are used. Where the preparation of a high viscosity polyvinyl dicarboxylic acid is desired, more dilution with the fatty acid is desirable than where low viscosity products are prepared. The amount of dicarboxylic acid anhydride employed should be such that it will supply phthalyl or other dicarboxylic acid groups to essentially all of the hydroxyl groups of the polyvinyl alcohol. Also, the anhydride used must be in sufficient amount that any moisture present will not diminish the net quantity thereof below that which is necessary to impart the desired dicarboxylic acid radical content. The following examples illustrate our invention:

*Example 1*

There was mixed together in a Werner-Pfleiderer mixer the following: 30 pounds of polyvinyl alcohol, 9.6 pounds of anhydrous sodium acetate, 96 pounds of phthalic anhydride, and 150 pounds of glacial acetic acid. While these materials were being mixed together, the temperature was raised to 160.170° F. and maintained within that range for 8 hours, the mixing being continued during that time. It was found that the material went into solution to form a phthalate ester. The viscous mass thus obtained was cooled and 300 pounds of water were slowly added while the mixing was continued. The polyvinyl phthalate obtained slowly precipitated and the water and acetic acid which were present acted as a solvent in removing the excess phthalic acid therein. The supernatant liquid was drained off and the mixing was continued with fresh changes of water. The product obtained analyzed 70.8% phthalyl and was useful for backings or antihalation layers for photographic film.

*Example 2*

A polyvinyl phthalate was prepared by mixing together while heated by a steam bath, 10 parts of polyvinyl alcohol, 30 parts of phthalic anhydride, 50 parts of glacial acetic acid and 16 parts of sodium acetate. A smooth solution formed and, after 4½ hours of heating, the product obtained was recovered by precipitation in water. This product had a phthalyl content of 66.4%. A similar run, using but 20 parts of phthalic anhydride, gave a polyvinyl phthalate having a phthalyl content of 62.8%.

*Example 3*

A polyvinyl succinate was prepared by heating together 20 parts of polyvinyl alcohol, 50 parts of succinic anhydride, 200 parts of acetic acid and 32 parts of sodium acetate. The mixed mass was heated for ½ hour on a steam bath and the product at that time was found to be insoluble in dilute sodium bicarbonate solution. After 1 hour heating, the product obtained was isolated by precipitating from the reaction mass using isopropyl alcohol.

*Example 4*

20 parts of polyvinyl alcohol were mixed for 3 hours on a steam bath with 100 parts of phthalic anhydride, 250 parts of acetic acid and 50 part sof anhydrous magnesium acetate. The mass was then diluted with acetic acid and precipitated in dilute aqueous hydrochloric acid. The product obtained was washed and dried and was found, upon analysis, to have a phthalyl content of 71.3%.

*Example 5*

A mixture of 20 parts of polyvinyl alcohol, 100 parts of phthalic anhydride, 200 parts of propionic acid and 50 parts of sodium acetate were mixed together for 5½ hours while heating on a steam bath. The polyvinyl phthalate obtained after separating by precipitation, thoroughly washing and drying exhibited a phthalyl content of 76.1%.

*Example 6*

A mixture was prepared of 10 parts of polyvinyl alcohol, 50 parts of phthalic anhydride, 100 parts of butyric acid and 50 parts of sodium acetate. The mass was mixed for 24 hours while heating on a steam bath. A heavy, semi-opaque dope was obtained. The mass was diluted with 80% acetic acid and was then poured into water, whereupon the polyvinyl phthalate precipitated. The washed and dried product had a combined phthalyl content of 43.6%.

*Example 7*

A mixture of 15 parts of polyvinyl alcohol, 56 parts of phthalic anhydride and 76 parts of glacial acetic acid was prepared. This was divided into 5 parts and to these parts were added 0, 1.5, 5, 7.5, and 15 parts, respectively, of pyridine, thereby forming pyridine acetate in the corresponding amounts. These portions were then subjected to agitation for 5 hours while heating on the steam bath. The portion containing no pyridine acetate could not be handled to give a satisfactory product. However, in the portions in which pyridine acetate was present, polyvinyl phthalates were isolated therefrom containing from 65 to 73% combined phthalyl.

The polyvinyl dicarboxylic acid esters prepared in accordance with our invention are adapted for use in any situation where insolubility in dilute aqueous acid is an attribute. These polyvinyl esters are soluble in water having an alkaline pH, such as containing a small amount of sodium bicarbonate. Polyvinyl phthalates prepared in accordance with our invention may be employed, for instance, for removable backings for photographic film, the backing layer being removable ordinarily in the alkaline development. Another use of the polyvinyl phthalates, prepared in accordance with our invention, is in the making of therapeutic products having enteric properties, for example, as described and claimed in Malm and Hiatt Patent 2,455,790.

As a solvent in the preparation of dicarboxylic acid esters of alcohol, in accordance with our invention, there may be used any lower fatty acid or substituted lower fatty acid of 2-4 carbon atoms. Some acids which may be employed in addition to those exemplified are monochloracetic acid, butyric acid, methoxy acetic acid, and the like. Salts of acetic acid which are soluble therein may be employed as the catalyst in processes in accordance with our invention. Of particular utility, however, are the alkali metal acetates, such as sodium or potassium acetate or the acetate or ammonia or of an organic base, such as pyridine, methylamine or the like.

Ordinarily the preparation of the polyvinyl dicarboxylic acid ester is carried out using a shalt as the catalyst therein, as the reaction proceeds more readily when catalyzed. However, it is possible to obtain satisfactory polyvinyl dicarboxylic acid esters in accordance with our invention, even though the catalyst is omitted. As an illustration of this point, the following example compares a procedure wherein the catalyst is employed with a similar procedure in which the catalyst is omitted: 2 mixtures were prepared of the following composition: 1 part polyvinyl alcohol, 12.5 parts glacial acetic acid, 5 parts phthalic anhydride. One of these mixtures was designated A, while the other, designated B, had added thereto 2.5 parts of sodium acetate. The 2 mixtures were heated on a steam bath, and portions thereof were taken from time to time, precipitated, washed and analyzed. The following table gives the phthalyl analyses after the various times at which samples were taken:

| Time | Phthalyl Analysis | |
| --- | --- | --- |
| | A | B |
| 2 hours | | 75.2 |
| 5 hours | 48.5 | 75.2 |
| 24 hours | 61.7 | 73.6 |
| 48 hours | 61.2 | |

In the case of the A mixture, at the end of 2 hours the reaction had not proceeded sufficiently that a product could even be isolated, but, on the other hand, if sufficient time is provided, an acceptable product may be obtained even without the use of catalyst.

It is to be understood that the term "polyvinyl alcohol," as used herein, is in the sense that that term is ordinarily employed in the art, namely, as referring to either a partially or completely hydrolyzed polyvinyl acylate. For instance, polyvinyl alcohol is ordinarily prepared by hydrolyzing polyvinyl acetate, and, whereas some types of polyvinyl alcohol are substantially completely hydrolyzed polyvinyl acetates, such as having no more than 5% of acetyl therein, other products which go by this designation may have up to 10 or even up to 15% of combined acetyl which is roughly equivalent to 20-25% of vinyl acetate in the polyvinyl alcohol. Therefore, the starting material for the preparation of polyvinyl dicarboxylic acid esters, in accordance with our invention, is an at least partially hydrolyzed polyvinyl acylate.

We claim:

1. A process for preparing polyvinyl dicarboxylic acid esters which comprises reacting upon a hydrolyzed polyvinyl organic acid ester with an anhydrous bath comprising an anhydride of a material consisting of a dicarboxylic acid, a lower fatty acid as the diluent and as the catalys an acid soluble salt having basic properties in aliphatic acid solution selected from the group consisting of the alkali metal, alkaline earth metal salts and the amine salts of acetic acid.

2. A process for preparing polyvinyl dicarboxylic acid esters which comprises reacting upon a partially hydrolized polyvinyl organic acid ester with an anhydrous bath comprising the anhydride of a material consisting of a dicarboxylic acid, a lower fatty acid as the diluent therein and as the catalyst an acid soluble salt having basic properties in aliphatic acid solution selected from the group consisting of the alkali metal salts, the alkaline earth metal salts and the amine salts of acetic acid.

3. A process for preparing polyvinyl dicarboxylic acid esters which comprises reacting upon a substantially completely hydrolyzed polyvinyl organic acid ester with an anhydrous bath comprising the anhydride of a material consisting of a dicarboxylic acid, a lower fatty acid as the diluent therein and as the catalyst an acid soluble salt having basic properties in aliphatic acid solution selected from the group consisting of the alkali metal salts, the alkaline earth metal salts and the amine salts of acetic acid.

4. A process for preparing polyvinyl dicarboxylic acid esters which comprises reacting upon a hydrolyzed polyvinyl organic acid ester with an anhydrous bath comprising an anhydride of a material consisting of a dicarboxylic acid, glacial acetic acid as the diluent therein and as the catalyst a salt soluble in glacial acetic acid, and having basic properties therein, selected from the group consisting of the alkali metal, the alkaline earth metal and the amine salts of acetic acid.

5. A process for preparing polyvinyl phthalate which comprises reacting upon a hydrolyzed polyvinyl organic acid ester with an anhydrous bath containing phthalic anhydride, a lower fatty acid as the diluent therein and as the catalyst an acid soluble salt having basic properties in aliphatic acid solution selected from the group consisting of the alkali metal, the alkaline earth metal salts and the amine salts of acetic acid.

6. A process for preparing polyvinyl phthalate which comprises reacting upon a hydrolyzed polyvinyl organic ester with an anhydrous bath containing phthalic anhydride, glacial acetic acid as the diluent therein and as the catalyst a salt soluble in glacial acetic acid selected from the group consisting of the alkali metal salts, the alkaline earth metal salts and the amine salts of acetic acid.

7. A process for preparing polyvinyl phthalate which comprises reacting upon a hydrolyzed polyvinyl organic acid ester with an anhydrous bath of phthalic anhydride, glacial acetic acid as the diluent therein and as the catalyst sodium acetate.

8. A process for preparing polyvinyl phthalate which comprises reacting upon a hydrolyzed polyvinyl organic acid ester with an anhydrous bath of phthalic anhydride, glacial acetic acid as the diluent therein and as the catalyst magnesium acetate.

9. A process for preparing polyvinyl phthalate which comprises reacting upon a hydrolyzed polyvinyl organic acid ester with an anhydrous bath of phthalic anhydride, glacial acetic acid as the diluent therein and as the catalyst pyridine acetate.

10. A process for preparing polyvinyl phthalate which comprises reacting upon substantially completely hydrolyzed polyvinyl acetate with an anhydrous bath of phthalic anhydride, glacial acetic acid as the diluent therein and as the catalyst sodium acetate.

References Cited in the file of this patent

UNITED STATES PATENTS 2,358,387    Dreyfus et al. _____ Sept. 19, 1944

OTHER REFERENCES

Ellis: Chemistry of Synthetic Resins, vol. 1, page 795 (1935), Reinhold, New York.